(No Model.)
N. J. SKAGGS.
TIRE TIGHTENER.
No. 310,918. Patented Jan. 20, 1885.
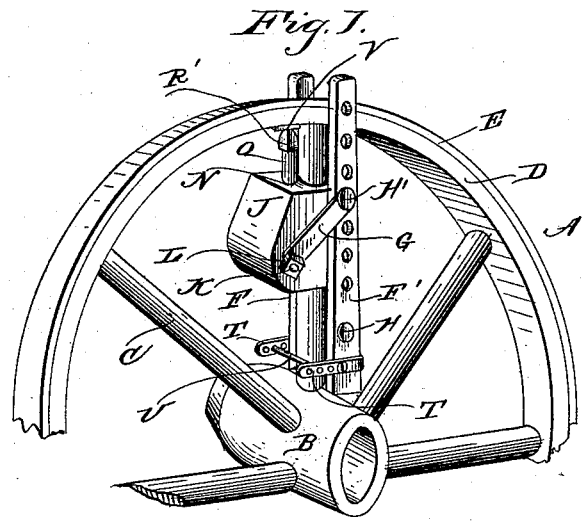
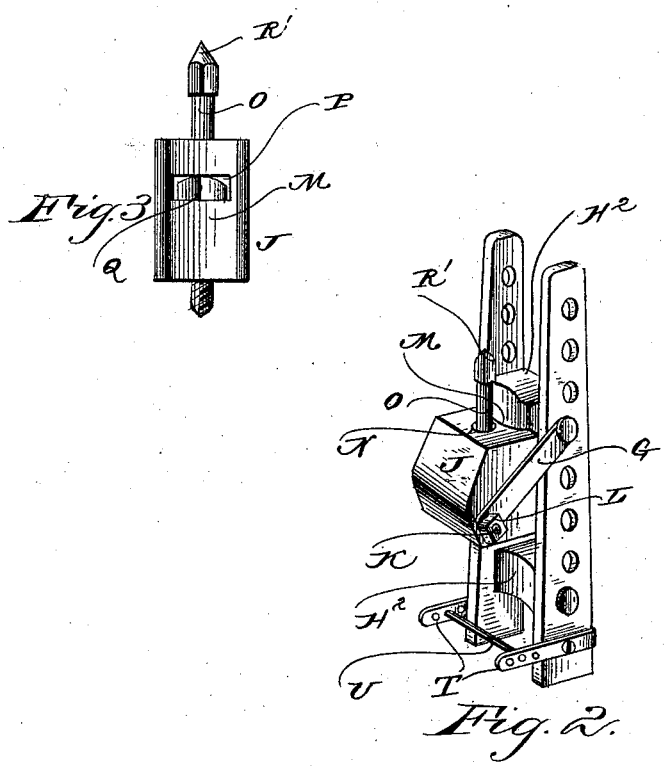
WITNESSES
N. J. Skaggs.
INVENTOR

UNITED STATES PATENT OFFICE.

NEWTON J. SKAGGS, OF MONTGOMERY, ALABAMA.

TIRE-TIGHTENER.

SPECIFICATION forming part of Letters Patent No. 310,918, dated January 20, 1885.

Application filed October 6, 1884. (No model.)

*To all whom it may concern:*

Be it known that I, NEWTON J. SKAGGS, a citizen of the United States, residing at Montgomery, in the county of Montgomery and State of Alabama, have invented a new and useful Improvement in Tire-Tighteners, of which the following is a specification, reference being had to the accompanying drawings.

My invention relates to tire-tighteners; and it consists in the construction and novel arrangement of parts, as will be hereinafter fully described, and particularly pointed out in the claims.

In the drawings, Figure 1 is a view in perspective of my improved tire-tightening device applied to a vehicle-wheel, and Fig. 2 is a view in perspective of the device removed from the wheel. Fig. 3 is an enlarged view of the block J, and Fig. 4 shows the wrench.

Referring by letter to the accompanying drawings, A designates a vehicle-wheel. B represents the hub, C the spokes, D the felly, and E the tire, of said wheel.

The tire-tightener consists of two metal bars, F F', each provided with a series of bolt-holes, G, and connected by bolts H H' and nuts to two intervening blocks, H².

In connection with the bars F F' strap-arms G G, of metal, are pivoted to the metal bars F F', the upper bolt, H', forming their pivotal points. Between the other ends of the strap-arms G G, I provide a block, J, which is secured in place by a lateral bolt, K, and nut L. The block J is provided with a concave face, M, which receives the spoke when in place on the wheel, and has a hole, N, made vertically through it for the tightening-screw O. From the concave face the block J is provided with a recess or mortise, P, which intersects the hole N, and in this recess P is placed a threaded nut, Q. The tightening-screw O has a pointed head, R', and is passed down through the hole N and threaded nut Q, and a lever or wrench, S, is provided for turning said screw O. Near the ends which rest on the hub of the wheel the bars F F' are provided with perforated arms T for a rod, U, which assists in holding the tightener in place on the wheel. A plate, V, concaved to fit the rounded face of the felly, is interposed between the point of the screw and the felly when the tightener is used to prevent the screw from injuring the felly. The screw is turned to raise the felly from the spoke, and metal washers are placed in the space between the shoulder of the spoke and the felly, and the tire is thereby tightened.

A combined lifting-jack and tire-tightener having a base provided with parallel ears having slots in which a wedge works to secure the device in place on a wheel has been combined with standards, a sliding bar, and a wedge for extending the sliding bar, prior to my invention, and I specifically disclaim said construction.

Having thus fully described my invention, what I claim as new, and desire to secure by Letters Patent of the United States, is—

1. The combination, with the perforated metal bars, the intervening blocks, and the connecting bolts and nuts, of the pivoted arms, the concaved block, and the tightening-screw, substantially as specified.

2. The combination, with the perforated metal bars, the intervening blocks, connecting-bolts, perforated arms T, and rod U, of the pivoted arms, the concaved block with the threaded nut, and the tightening-screw, substantially as specified.

3. The combination, with the perforated metal bars, their blocks and connecting-bolts, of the hinged recessed block, the threaded nut, and the tightening-screw, substantially as specified.

4. The combination, with the perforated metal bars having the perforated arms T, the intervening blocks, connecting bolts and nuts, and rod U, of the hinged recessed block, the threaded nut, and the tightening-screw, substantially as specified.

In testimony that I claim the foregoing as my own I have hereto affixed my signature in presence of two witnesses.

NEWTON J. SKAGGS.

Witnesses:
P. KENNEDY,
S. D. OLIVER, Jr.